(12) United States Patent
Hsu et al.

(10) Patent No.: US 9,774,636 B2
(45) Date of Patent: Sep. 26, 2017

(54) UTILIZE EXTRA WEB SEMANTIC FOR VIDEO CACHING

(75) Inventors: Wei-Jen Hsu, Fremont, CA (US); Bhaskar Bhupalam, Santa Clara, CA (US); Jay Iyer, San Jose, CA (US); Douglas Chan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1193 days.

(21) Appl. No.: 13/556,241

(22) Filed: Jul. 24, 2012

(65) Prior Publication Data

US 2014/0032698 A1   Jan. 30, 2014

(51) Int. Cl.
| | |
|---|---|
| G06F 15/173 | (2006.01) |
| H04L 29/06 | (2006.01) |
| H04N 21/24 | (2011.01) |
| H04N 21/472 | (2011.01) |
| G06F 17/30 | (2006.01) |
| H04L 29/08 | (2006.01) |
| H04N 21/231 | (2011.01) |
| H04N 21/4786 | (2011.01) |
| H04N 21/4788 | (2011.01) |

(52) U.S. Cl.
CPC ........ *H04L 65/105* (2013.01); *H04L 65/4084* (2013.01); *H04L 67/2852* (2013.01); *H04N 21/23106* (2013.01); *H04N 21/2408* (2013.01); *H04N 21/472* (2013.01); *G06F 17/30132* (2013.01); *G06F 17/30864* (2013.01); *H04L 67/22* (2013.01); *H04L 67/2842* (2013.01); *H04N 21/23116* (2013.01); *H04N 21/4786* (2013.01); *H04N 21/4788* (2013.01)

(58) Field of Classification Search
CPC ....... H04N 21/23106; H04N 21/23116; H04N 21/2408; H04N 21/472; H04N 21/4786; H04N 21/4788; H04L 67/22; H04L 67/2842; H04L 65/4084; H04L 65/105; H04L 67/2852; G06F 17/30132; G06F 17/30864
USPC ................................................ 709/219, 226
See application file for complete search history.

(56) References Cited

U.S. PATENT DOCUMENTS

| | | | | |
|---|---|---|---|---|
| 2002/0007392 | A1* | 1/2002 | Buddhikot | ............. H04N 7/165 709/203 |
| 2006/0008256 | A1* | 1/2006 | Khedouri | .......... G06F 17/30038 386/234 |
| 2008/0059721 | A1* | 3/2008 | Turner | ............. G06F 17/30132 711/154 |
| 2009/0217177 | A1* | 8/2009 | Degrazia | ............... G06F 3/0481 715/753 |
| 2009/0248787 | A1* | 10/2009 | Sivasubramanian | ......................... G06F 17/30887 709/201 |

(Continued)

OTHER PUBLICATIONS

Soam Acharya et al., "MiddleMan: A Video Caching Proxy Server", International Workshop on Network and Operating System Support for Digital Audio and Video (NOSSDAV) 2000, 15 pgs.

(Continued)

*Primary Examiner* — Oleg Survillo
(74) *Attorney, Agent, or Firm* — Merchant & Gould P.C.

(57) ABSTRACT

Semantic data corresponding to video data may be received. Next, the received semantic data corresponding to the video data may be analyzed. Caching decisions may then be made based upon the analysis of the received semantic data corresponding to the video data.

25 Claims, 3 Drawing Sheets

(56) References Cited

U.S. PATENT DOCUMENTS

| | | | | |
|---|---|---|---|---|
| 2009/0254643 | A1* | 10/2009 | Terheggen | G06F 17/3005 709/223 |
| 2010/0082526 | A1* | 4/2010 | Wassingbo | G06F 17/30867 707/603 |
| 2010/0088394 | A1* | 4/2010 | Barbieri | G06Q 30/00 709/217 |
| 2011/0202854 | A1* | 8/2011 | Chan | G06F 3/1454 715/762 |
| 2011/0289139 | A1* | 11/2011 | McIntosh | H04N 21/252 709/203 |
| 2011/0320592 | A1* | 12/2011 | Kemmerer, Jr. | H04L 41/0896 709/224 |
| 2012/0066196 | A1* | 3/2012 | Dempski | G06F 17/30864 707/706 |
| 2012/0084215 | A1* | 4/2012 | Trier | G06Q 10/06 705/301 |
| 2012/0096116 | A1* | 4/2012 | Mislove | H04L 67/2814 709/217 |
| 2012/0136714 | A1* | 5/2012 | Nesamoney | G06Q 30/02 705/14.43 |
| 2012/0237183 | A1* | 9/2012 | Chen | H04N 7/17318 386/241 |
| 2013/0046849 | A1* | 2/2013 | Wolf | H04L 67/2842 709/217 |
| 2013/0054728 | A1* | 2/2013 | Amir | H04N 21/2183 709/213 |
| 2013/0055321 | A1* | 2/2013 | Cline | H04N 21/2146 725/77 |
| 2013/0144979 | A1* | 6/2013 | Kansal | H04N 21/23106 709/219 |
| 2013/0191401 | A1* | 7/2013 | Xia | G06F 17/30858 707/751 |
| 2013/0227048 | A1* | 8/2013 | Xie | H04L 67/327 709/213 |
| 2013/0275577 | A1* | 10/2013 | Lim | G06F 17/30905 709/224 |
| 2013/0298175 | A1* | 11/2013 | Agrawal | H04N 21/222 725/93 |
| 2013/0346877 | A1* | 12/2013 | Borovoy | H04L 65/4084 715/753 |
| 2014/0164547 | A1* | 6/2014 | Fullagar | H04L 65/4084 709/213 |

OTHER PUBLICATIONS

Michael Zink et al., "Watch Global, Cache Local: YouTube Network Traffic at a Campus Network—Measurements and Implications," University of Massachusetts-Amherst, ScholarWorks@UMass Amherst, Computer Science Department Faculty Publication Series, Elsevier Computer Networks, 2009, 14 pgs.

Xu Cheng et al., "Statistics and Social Network of YouTube Videos," School of Computing Science, Simon Fraser University, $16_{th}$ International Workshop on Quality of Service, IWQoS 2008, 10 pgs.

\* cited by examiner

UTILIZE EXTRA WEB SEMANTIC FOR VIDEO CACHING

BACKGROUND

Content delivery describes the delivery of media content such as audio, video, computer software, and video games over a delivery medium such as broadcasting or the Internet. Specialist networks, known as content delivery networks, distribute digital content on the Internet. Alternative technologies for content delivery include peer-to-peer file sharing technologies. Content can only be delivered if it exists. If it does not exist, several techniques and methods can be used for content creation or content regeneration. Alternatively, content delivery platforms create and syndicate content remotely, acting like hosted content management systems.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
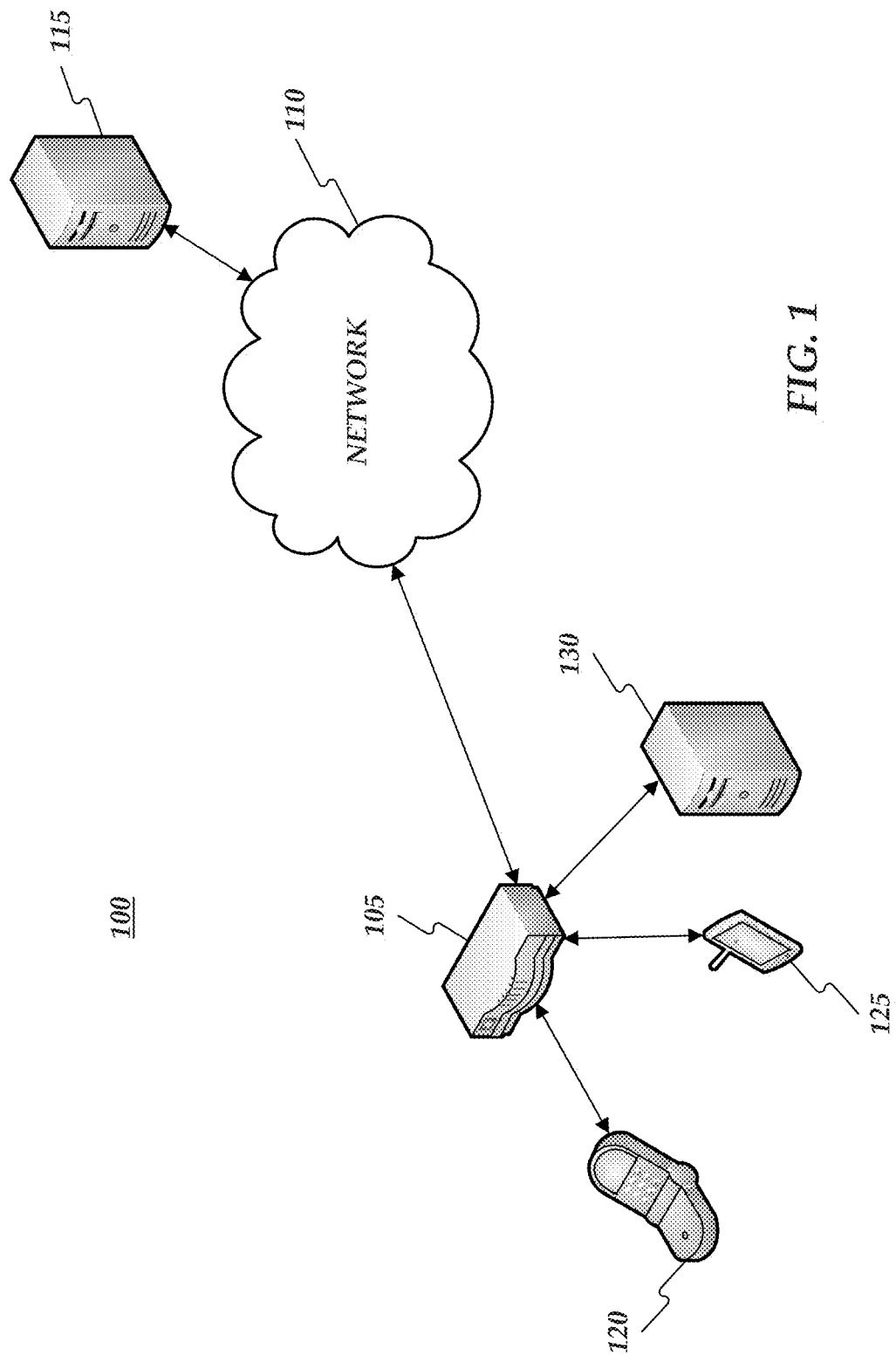
FIG. 1 shows an operating environment.

Semantic data corresponding to video data may be received. Next, the received semantic data corresponding to the video data may be analyzed. Caching decisions may then be made based upon the analysis of the received semantic data corresponding to the video data.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In consuming content, many people follow video sharing semantics (e.g., video recommendations, watch lists, popular video search results, popular news/events) while consuming videos on video sharing sites. Consequently, consistent with embodiments of the disclosure, caching heuristics to leverage such semantics may be used to make caching decisions in addition to object popularity/hit count. Caching may include a caching decision comprising a decision made to store videos that have been watched earlier and meet a hit count based criteria. Caching may also include a "pre-caching" decision to retrieve a particular video that may be predicted to become popular before it meets the hit count based criteria. In some cases, pre-caching can be triggered even if the video in question has not been watched even once, but is predicted to become popular in the future.

Video sharing sites may generate tremendous amount of new content (e.g. video clips) each day. Among these video clips, some may become popular and generate large hit counts. To conserve network bandwidth used to deliver such video to users, conventional web caching may be performed. However, conventional web caching relies mainly on the popularity of individual web objects to determine what to keep in cache.

There are several drawbacks in this conventional approach. First, the rationale behind hit-count based caching is reactive because an object is never cached until it gets popular, as defined by system parameters (i.e. in terms of hit count, etc.). Thus, the first few accesses to the object are always a cache miss. With this conventional approach, there is no attempt to predict if some object will become popular. In other words, conventional systems may assess the popularity of each web object as an independent entity, ignoring the fact that in many cases, the viewing of video clips follows a somewhat predictable pattern.

Consistent with embodiments of the disclosure, web semantics may be levered in video sharing sites to improve caching heuristics. Video sharing websites are more "structured" than general Internet web pages and many additional human generated syntax can be leveraged to help pre-caching. Such information may include video categorization, tags added by user, related video, video playlist, user comments and votes, etc. Consistent with embodiments of the disclosure, all of these information sources can help pre-caching. Furthermore, while the target application may be video, popular key word/link trends in other domains may be used, such as news search or social network share, to help determining which videos should be cached.

By understanding video sharing semantics, embodiments of the disclosure may cache video clips that are becoming popular before they reach the popularity threshold defined in conventional hit-count-based web caching. Embodiments of the disclosure may also cache video clips that may not be popular (and thus not be cached in by conventional systems), but are highly likely to be viewed next by a user. This may work, for example, for video sharing sites where large amount of new videos are created daily, but the accesses to these videos are highly guided by how they are presented in the webpages (e.g. recommendation, watch list, relevant videos to news events). By being able to leverage on users' video viewing behaviors, embodiments of the disclosure may improve network efficiency and user experience.

FIG. 1 is a block diagram of an operating environment 100. As shown in FIG. 1, operating environment 100 may include an access point 105, a network 110, and a proxy server 115. Access point 105 may obtain content from proxy server 115 over network 110 and provide a first user device 120, a second user device 125, and a third user device 130 with the obtained content. Proxy server 115 may also include a cache. Proxy server 115 may request and receive content from content servers (not shown) connected to network 110. The content servers may comprise, but are not limited to, video sharing websites, news websites, and internet search engine websites.

The obtained content may comprise a data file that may comprise video and/or audio data such as web data object requests. Notwithstanding, the content may comprise any type of data. Network 110 may comprise any type of network (e.g. the Internet, a content delivery network (CDN), etc.) capable of delivering content from proxy server 115 to access point 105. First user device 120, second user device 125, and third user device 130 may comprise any type of devices capable of requesting and receiving the obtained content from access point 105. For example, first user device 120 may comprise a smart phone, second user device 125 may comprise a tablet computer, and third user device 130 may comprise any type of computing device. Access point 105 may comprise, but is not limited to, a Wi-Fi access point, a cellular base station, a switch servicing multiple clients in a vicinity, a tablet device, a mobile device, a smart phone, a telephone, a remote control device, a set-top box, a digital video recorder, a cable modem, a personal computer, a network computer, a mainframe, a router, or other similar microcomputer-based device.

Consistent with embodiments of the disclosure, whenever an online video (e.g. a data file) is requested by a user (e.g. using first user device 120), network 110 may deliver objects corresponding to the video data across network 110. If the user is a wireless client, its associated access point (e.g. Wi-Fi access point (AP), mobile cellular base station (BS), etc.) may be the first node (e.g. access point 105) in the network to relay the video request.

Figure 2:
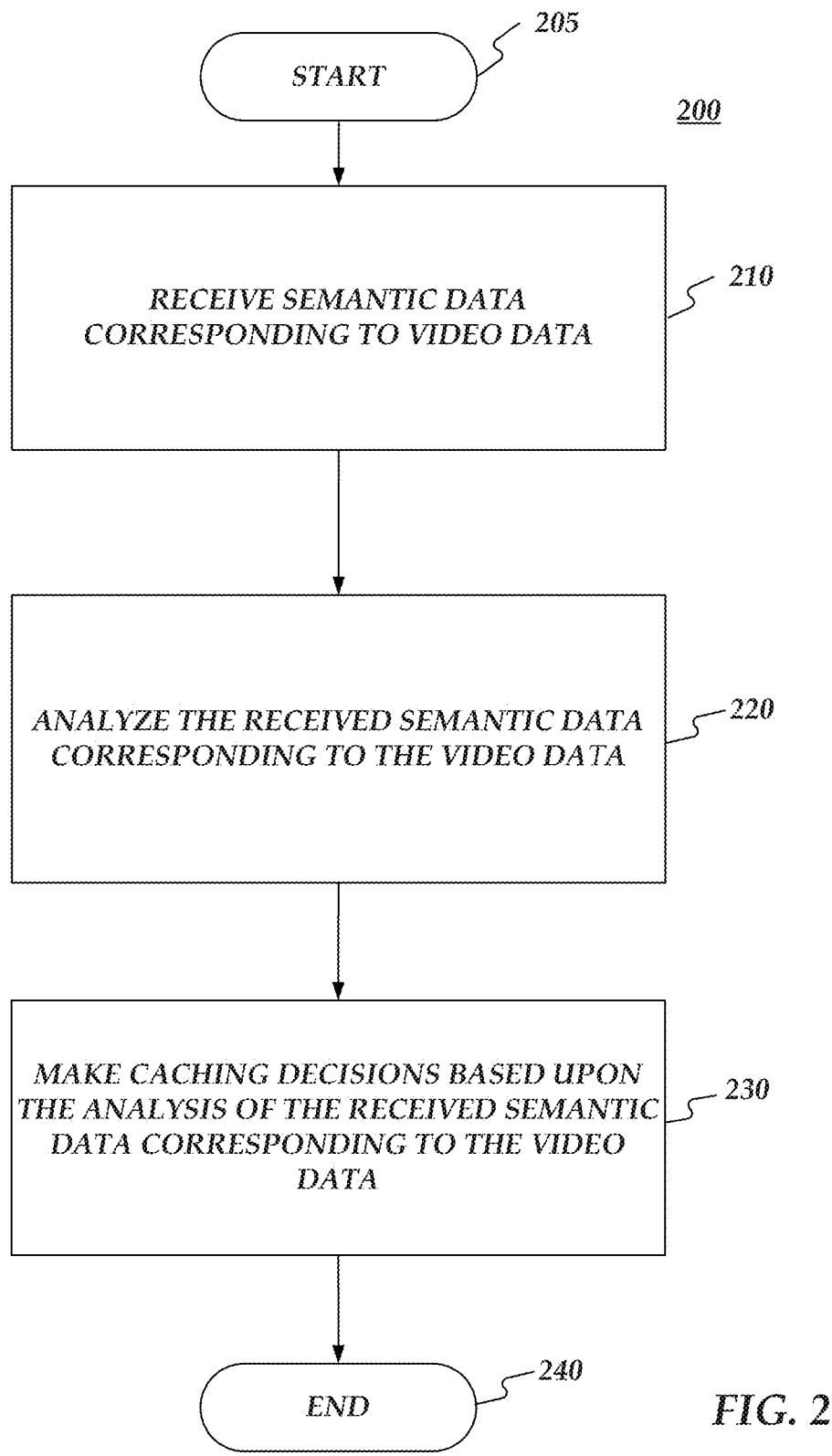
FIG. 2 is a flow chart of a method for caching content.

FIG. 2 is a flow chart setting forth the general stages involved in a method 200 consistent with an embodiment of the disclosure for caching content. Method 200 may be implemented using a computing device 300 as described in more detail below with respect to FIG. 3. Ways to implement the stages of method 200 will be described in greater detail below. Computing device 300, for example, may be embodied in proxy server 115 or any device connected to network 110.

Method 200 may begin at starting block 205 and proceed to stage 210 where computing device 300 may receive semantic data corresponding video data. The semantic data may comprise, but is not limited to, related video data, watch list data, search terms, and link-sharing data. Notwithstanding, the video data may correspond to data related to the consumption of video or the pre-consumption of video. For example, a user may be using first user device 120, second user device 125, or third user device 130 to obtain content via proxy server 115. Proxy server 115 may obtain semantic data related to the user's data activities and make caching decisions by leveraging the received semantic data as described in greater detail below.

Regarding related video data, many video sharing websites may provide links for "related video" when the user is watching a given video. In these cases, after watching one video, the user may follow these links to see another video. Consequently, if one particular video gains popularity, the other videos showing up as related videos may gain popularity too. Accordingly, consistent with embodiments of the disclosure, a webpage may be parsed by computing device 300 that may preemptively cache these related videos if the main video is popular enough. Related video links from different video clips towards the same video clip (i.e. if video A and video B both have video C as related video) may also be considered, by combining the popularity of video A and B to determine how likely C is going to be accessed.

Regarding watch list data, many video sharing websites also allow users to set up a "watch list" and share it with other users. If a watch list gets popular, people following this list may all view video clips in a given sequence. This sequence of accessing video objects can be mined as a "walk" of predefined paths among video objects. If a certain path becomes frequently traversed (i.e., the watch list has become popular), it may make sense to treat video clips in this popular watch list as a group rather than individual assets, since they are most likely watched in a group. The intersection of multiple popular walks may be considered as the most likely candidate for caching. And often times, the videos on the watch list are automatically played in the listed order sequentially. So whenever computing device 300 can detect from the web sematic that a user is auto-playing a watch list sequentially, then it will improve efficiency to cache the next video on the list, since such a video may be likely to be watched next.

Regarding search term data, some video sharing sites also publish statistics about popular search terms used for video search. Most users start watching video by entering one of these terms and follow one of the results. Consequently, embodiments of the disclosure may follow these popular search terms and cache the returned results preemptively. This can be further extended to searches that happen outside of the video sharing site (e.g. search engine news search, new website searches, etc.). If certain keywords gain popularity in other search websites, it is likely that videos related to this event will get popular, too. Consistent with embodiments of the disclosure, related videos to recent hot topics may be candidates to be cached even if the video itself has not seen many hit counts yet.

Regarding link-sharing data, users may click on the URLs received over e-mail, text messages, or in the webpage they are browsing. Consistent with embodiments of the disclosure, popularity prediction based on: i) counting a video link being cited in e-mail exchanges (i.e., a popular video link is being sent around); or ii) counting links to a video appearing in social network pages downloaded (e.g., someone posts a video link on a social network, then the link appears in part of the social network page download).

Embodiments of the disclosure may also augment the above with localization, and populate local caches with preferences based on local users (e.g., the preference for videos to watch is likely to be different on university campuses as compared to a community with elderly citizens). Network traffic analysis and data mining may be applied to find out the preference of the local network users. The description of video clips may be indexed and compared against previously learned preferences. This cache system may be geared towards keeping more relevant items in local interests first.

Furthermore, embodiments of the disclosure can leverage the similarity in people's interest across different time zones. For example, some videos may become significantly popular on the East coast in early morning. Consequently, embodiments of the disclosure may predict the same will happen on the West coast and prepopulate caches with this video accordingly.

From stage 210, where computing device 300 receives semantic data corresponding to video data, method 200 may advance to stage 220 where computing device 300 may analyze the received semantic data corresponding to the video data. For example, embodiments of the disclosure may leverage semantic data available (e.g. in addition to just count of video clip access) to predict what contents may become popular. The semantic data may come from, for example, video sharing sites (e.g., related video, playlists) or from other sources that may be relevant to what may become popular video (e.g., search keywords, video link shares). The analysis may generate a "semantic based popularity rank" that can be effectively used to guide caching decisions. Also, embodiments of the disclosure are not limited to pre-caching. They may also be used in video recommendations (e.g. based on user interest) or targeted advertising.

Embodiments of the disclosure may provide a process to gather popularity information (e.g. within the semantic data) and use this information to generate the semantic based popularity rank. The semantic based popularity rank is one possible usage of the gathered popularity information. In general, the semantic based popularity rank can be a weighted combination of the various forms of semantic data gathered in stage 210. For example, an equation for the semantic based popularity rank may comprise the equation shown below. The below equation is an example and others may be used. As for the values of the weights shown in the below equation, they may be user defined according to which factor the user considers is more important. Embodiments of the disclosure may use any pre-selected value for these weights.

$$\text{Semantic Based Popularity Rank} = (Weight_1) * (\text{times link referred to in related content}) + (Weight_2) * (\text{times a playlist including the content has been followed}) + (Weight_3) * (\text{number of times content link included in other means of sharing (e.g., email, social network, etc.)}) + (weight_4) * (\text{other semantic data}).$$

Once computing device 300 analyzes the received semantic data corresponding to the video data in stage 220, method 200 may continue to stage 230 where computing device 300 may make caching decisions based on the analysis of the received semantic data corresponding to the video data. For example, embodiments of the disclosure may decide whether to cache content based on the above semantic based popularity rank. If the content receives a high enough rank, then it may be cached. Also, similar logic can be applied at cache eviction time. Instead of the simple heuristic to replace the least recently referenced item, some of the above web semantics can be leveraged to distinguish the ones that are more likely to be popular in the future (although the current hit count is low) and keep them in cache. After computing device 300 makes caching decisions based upon the analysis of the received semantic data corresponding to the video data in stage 230, method 200 may then end at stage 240.

Figure 3:
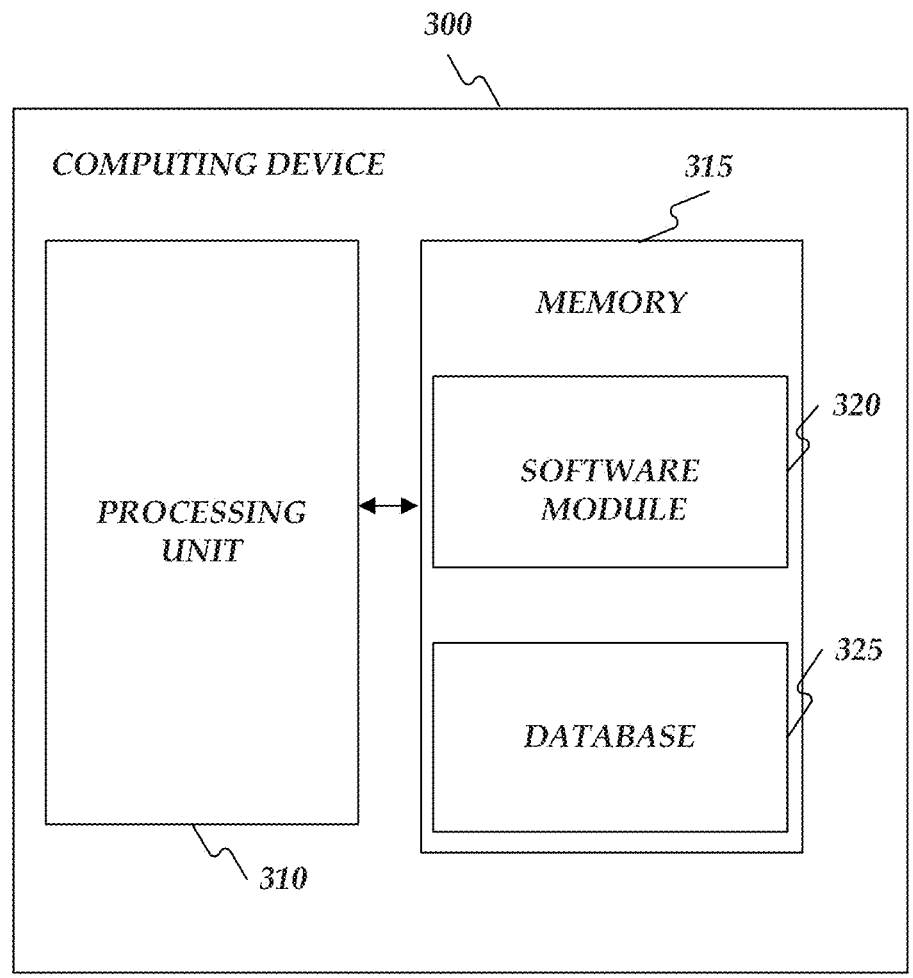
FIG. 3 shows a computing device.

FIG. 3 shows computing device 300 in more detail. As shown in FIG. 3, computing device 300 may include a processing unit 310 and a memory unit 315. Memory unit 315 may include a software module 320 and a database 325. While executing on processing unit 310, software module 320 may perform processes for caching content, including for example, any one or more of the stages from method 200 described above with respect to FIG. 2. Memory unit 315 may also include the cache. Computing device 300, for example, may provide an operating environment for access point 105, proxy server 115, first user device 120, second user device 125, or third user device 130. Access point 105, proxy server 115, first user device 120, second user device 125, or third user device 130 may operate in other environments and are not limited to computing device 300.

Computing device 300 ("the processor") may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

An embodiment consistent with the disclosure may comprise a system for caching content. The system may comprise a memory storage and a processing unit coupled to the memory storage. The processing unit may be operative to receive semantic data corresponding to video data. In addition, the processing unit may be operative to analyze the received semantic data corresponding to the video data and to make caching decisions based upon the analysis of the received semantic data corresponding to the video data.

Another embodiment consistent with the disclosure may comprise a system for caching content. The system may comprise a memory storage and a processing unit coupled to the memory storage. The processing unit may be operative to receive semantic data corresponding to video data. The semantic data may be received from a video sharing site. Moreover, the processing unit may be operative to analyze the received semantic data corresponding to the video data wherein analyzing the received semantic data corresponding to the video data may comprise defining a sematic based popularity rank. In addition, the processing unit may make caching decisions based upon the sematic based popularity rank.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving semantic data corresponding to video data;
   analyzing the received semantic data corresponding to the video data; and
   making caching decisions based upon the analysis of the received semantic data corresponding to the video data, wherein making caching decisions based upon the analysis of the received semantic data corresponding to the video data comprises:
   defining a semantic based popularity rank comprising a weighted combination of various forms of the received semantic data;
   localizing the received semantic data, wherein localizing comprises determining preferences of network users within a geographic area;
   determining the semantic based popularity rank for the video data based on the localized semantic data, wherein determining the semantic based popularity rank comprises determining, from the preferences of the network users within the geographic area, a weighted combination of a number of times of the following: a link to the video data is referred to in related content, a playlist including the link to the video data has been followed, and the link to the video data is included in link-sharing data; and
   caching the content in caches for use by users based on the determined semantic based popularity rank.

2. The method of claim 1, wherein receiving the semantic data corresponding to the video data comprises receiving the semantic data from a video sharing site.

3. The method of claim 1, wherein receiving the semantic data corresponding to the video data comprises receiving the semantic data comprising related video data.

4. The method of claim 1, wherein receiving the semantic data corresponding to the video data comprises receiving the semantic data comprising watch list data.

5. The method of claim 1, wherein receiving the semantic data corresponding to the video data comprises receiving the semantic data comprising search terms.

6. The method of claim 1, wherein receiving the semantic data corresponding to the video data comprises receiving the semantic data comprising search terms from a video sharing site.

7. The method of claim 1, wherein receiving the semantic data corresponding to the video data comprises receiving the semantic data comprising search terms from a search engine site.

8. The method of claim 1, wherein receiving the semantic data corresponding to the video data comprises receiving the semantic data comprising link-sharing data.

9. The method of claim 1, wherein receiving the semantic data corresponding to the video data comprises receiving the semantic data comprising link-sharing data shared via a social media site.

10. The method of claim 1, wherein receiving the semantic data corresponding to the video data comprises receiving the semantic data comprising link-sharing data shared via e-mail.

11. The method of claim 1, wherein making caching decisions based upon the analysis of the received semantic data corresponding to the video data comprises making a decision as to what to add to a cache.

12. The method of claim 1, wherein making caching decisions based upon the analysis of the received semantic data corresponding to the video data comprises making a decision as to what to remove from a cache.

13. The method of claim 1, wherein making caching decisions based upon the analysis of the received semantic data corresponding to the video data comprises:
   determining that content is popular in a geographic area; and
   caching the content in the geographic based upon determining that content is popular in the geographic area.

14. A method comprising:
   receiving semantic data corresponding to video data, the semantic data being received from a video sharing site;
   analyzing the received semantic data corresponding to the video data wherein analyzing the received semantic data corresponding to the video data comprises defining a semantic based popularity rank, wherein the semantic based popularity rank comprises a weighted combination of various forms of the received semantic data;
   localizing the received semantic data, wherein localizing comprises determining preferences of network users within a geographic area;
   determining the semantic based popularity rank for the video data based on the localized semantic data, wherein determining the semantic based popularity rank comprises determining the weighted combination of a number of the following: a link to the video data is referred to in related content, a playlist including the link to the video data has been followed, and the link to the video data is included in link-sharing data;

making caching decisions based upon the semantic based popularity rank;

caching content based on the caching decisions; and providing the content to users in response to user requests.

15. The method of claim 14, wherein receiving the semantic data corresponding to the video data comprises receiving the semantic data comprising search terms.

16. The method of claim 15, wherein receiving the semantic data corresponding to the video data comprises receiving the semantic data comprising search terms from a video sharing site.

17. The method of claim 15, wherein receiving the semantic data corresponding to the video data comprises receiving the semantic data comprising search terms from a search engine site.

18. The method of claim 14, wherein receiving the semantic data corresponding to the video data comprises receiving the semantic data comprising the link-sharing data.

19. The method of claim 18, wherein receiving the semantic data corresponding to the video data comprises receiving the semantic data comprising the link-sharing data shared via a social media site.

20. The method of claim 18, wherein receiving the semantic data corresponding to the video data comprises receiving the semantic data comprising the link-sharing data shared via e-mail.

21. The method of claim 14, wherein defining the semantic based popularity rank comprises defining the semantic based popularity rank comprising the following equation:

semantic based popularity rank=(weight$_1$)*(number of times the link to the video data is referred to in the related content)+(weight$_2$)*(number of times the playlist including the link to the video data has been followed)+(weight$_3$)*(number of number of times the link to the video data is included in the link-sharing data); and wherein weight$_1$, weight$_2$, weight$_3$ are user defined.

22. An apparatus comprising:

a memory storage; and a processing unit coupled to the memory storage, wherein the processing unit is operative to:

receive semantic data corresponding to video data, the semantic data being received from a video sharing site;

define a semantic based popularity rank comprising a weighted combination of various forms of the received semantic data;

localizing the received semantic data, wherein localizing comprises determining preferences of network users within a geographic area;

determine the semantic based popularity rank for the video data based on the localized semantic data, wherein processing unit configured to determine the semantic based popularity rank comprises the processing unit configured to determine the weighted combination of a number of times of the following: a link to the video data is referred to in related content, a playlist including the link to the video data has been followed, and the link to the video data is included in link-sharing data;

make caching decisions based on the determined semantic based popularity rank for the video data; and caching content based on the caching decisions.

23. The apparatus of claim 22, wherein the semantic data comprises related video data.

24. The apparatus of claim 22, wherein the semantic data comprises watch list data.

25. The apparatus of claim 22, wherein the processing unit being operative to make caching decisions comprises the processing unit being operative to make a decision to cache when the semantic based popularity rank is greater than a predetermined value.

* * * * *